United States Patent [19]

Maaghul

[11] 4,038,243

[45] July 26, 1977

[54] GLASS FIBER SIZING COMPOSITIONS FOR THE REINFORCEMENT OF RESIN MATRICES

[75] Inventor: John Maaghul, Monroeville, Pa.

[73] Assignee: PPG Industries, Inc., Pittsburgh, Pa.

[21] Appl. No.: 668,754

[22] Filed: Mar. 22, 1976

Related U.S. Application Data

[62] Division of Ser. No. 606,272, Aug. 20, 1975, which is a division of Ser. No. 512,646, Oct. 7, 1974, Pat. No. 3,936,285.

[51] Int. Cl.$^2$ .............................................. C08K 3/40
[52] U.S. Cl. .................................. 260/40 R; 260/862
[58] Field of Search .................... 260/29.2 E, 29.2 M, 260/29.6 RW, 29.6 RB, 29.6 N, 29.2 UA, 862, 40 R

[56] References Cited

U.S. PATENT DOCUMENTS

| | | | |
|---|---|---|---|
| 2,133,238 | 10/1938 | Slayter et al. | 117/52 |
| 2,698,558 | 1/1955 | Hawley et al. | 260/29.2 UA X |
| 2,763,573 | 9/1956 | Biefeld | 260/29.2 UA X |
| 2,846,348 | 8/1958 | Marzocchi et al. | 154/90 |
| 2,951,772 | 9/1960 | Marzocchi et al. | 260/29.2 UA X |
| 3,414,432 | 12/1968 | Mertzweiller et al. | 117/126 |
| 3,464,942 | 9/1969 | Hathwar | 260/22 |
| 3,684,467 | 8/1972 | Smucker et al. | 65/3 |

*Primary Examiner*—Sandra M. Person

*Attorney, Agent, or Firm*—Alan T. McDonald; John E. Curley

[57] ABSTRACT

A glass fiber sizing composition for the reinforcement of resin matrices is provided which comprises a homogeneous aqueous composition of two polyester resins. The first polyester resin is a water solubilized condensation cross-linkable, polyester resin, insoluble in aromatic solvents. The second polyester resin is insoluble but dispersible in water but insoluble in the first polyester resin. Thus, when the second polyester is blended with a water solution of the first polyester, a dispersion is produced. In this dispersion the water and the first polyester form the continuous phase and the second polyester forms the dispersed phase. A plasticizer and two silane coupling agents are also incorporated into the sizing composition. The first coulping agent is provided to promote adhesion between the glass fibers and the resin matrix and the second silane coupling agent is employed in the sizing composition to control the wetting of the glass fibers by the first silane coupling agent. A thermoplastic polymer of sufficiently low molecular weight is employed to impart pressure sensitive adhesive characteristics to the sizing composition. Glass fibers sized with the sizing composition of the invention have found particular utility when incorporated into resin matrices which are utilized as molding compounds.

2 Claims, No Drawings

GLASS FIBER SIZING COMPOSITIONS FOR THE REINFORCEMENT OF RESIN MATRICES

REFERENCE TO CORSS-RELATED APPLICATIONS

This application is a division of application Ser. No. 606,272, filed Aug. 20, 1975, which is a division of application Ser. No. 512,646, filed Oct. 7, 1974, now U.S. Pat. No. 3,936,285.

FIELD OF THE INVENTION

This invention relates to a glass fiber sizing composition, a method of applying the sizing composition to glass fibers during formation, and glass fibers for incorporation into molding compounds.

BACKGROUND OF THE INVENTION

A glass fiber strand is composed of a multitude of fine glass filaments which are formed by being drawn at a high rate of speed from molten cones of glass at the tips of small orifices in a bushing such as shown in U.S. Pat. No. 2,133,238. During formation, the filaments are coated while moving at a speed on the order of 1,524 to 6,096 meters per minute with a size which contains a binder to give the strand integrity and workability for any standard textile or reinforcement use. The size also contains a lubricant for the filaments to prevent damage to the strand by abrasion of the individual filaments against each other or against handling equipment during processing.

The attenuative force supplying the high speed drawing force to form the fine glass filaments is usually provided by a winder or a wheel puller. A winder is typically a rotating drum on which a paper tube (forming tube) is placed. As the fibers are drawn and gathered into strands, the strands are collected on the forming tube which rotates with the winder. The wheel puller, as an attenuative device, is primarily a pair of tractive, juxtaposed surfaces which pull the strand and project or direct it to a collecting apparatus.

Glass fibers in the form of strand, both continuous and chopped, mat and roving having found utility in the area of reinforcing resinous matrices.

Roving is formed by mounting a plurality of glass fiber forming packages on a creel or support and gathering the strands from the separate packages in parallel, to form a rope or roving. This braided rope or roving is wound on a rotating drum to collect the roving. The roving so produced has a plurality of uses. It can be chopped and separated into separate strands to form chopped strand. It can be woven to form woven roving or it can be used by merely unwinding and impregnating it with resin for applications such as filament winding and pultrusion. Roving in whatever form utilized imparts substantial strength to resin composites reinforced therewith.

Roving which has been chopped to form chopped strand has found utility in the area of glass fiber reinforced molding compounds. In one area of glass fiber reinforced molding compounds, glass fibers which have been chopped are dispersed through a thickened, polymerizable polyester resinous material. This thickened resinous material with the glass fibers dispersed therethrough has a substantial viscosity in order that it may be handled by conventional techniques for such molding compounds.

In order to obtain a glass fiber roving which is acceptable for utilization in not only the molding compound area but also any reinforcement area the formation and processing of the roving must present as few problems in production as possible. The glass fiber strand, to form the roving must have integrity in order to tolerate the processing necessary in forming the roving and in subsequent unwinding and chopping. Also when the strands are gathered in parallel to form the roving, it is desirable that they cohere to each other to form a uniform rope. However, this adhesion between strands in the roving should not be too great because unwinding of the roving and passage of the roving through the chopping apparatus will be difficult if too much tack is imparted to the strand and the roving formed therefrom.

The strands within the roving must also be capable of being dissociated from each other during the chopping of the roving so that they may uniformly disperse throughout the molding premix.

Another problem associated with the forming of glass fibers is the migration of the binder and sizing composition when the fibers are dried after formation. The aqueous sizing composition is coated onto the fibers as they are formed and the strand, which consists of gathered fibers. The strand is then wound on a forming package. These forming packages are subsequently dried in an oven and if desired, under reduced pressure. During this drying process, the solids of the sizing composition have a tendency to migrate from the inside of the package to the outside of the package. Therefore, the strands which are on the outside of the package have substantially more sizing composition thereon than the inside strands of the package. This causes nonuniformity of the performance of the strands and roving formed from the strands. Hence, it is desirable to have a sizing composition which is nonmigratory and produces a uniform distribution of sizing composition on the strands throughout the forming package.

Along with the processing properties, the strand must also demonstrate excellent adhesion to the resin matrix to effectively reinforce the plastic article formed therefrom. Therefore both the chemical and physical properties of the glass fiber strand in the resin matrix are determined primarily by the sizing composition placed on the strand during formation.

The instant invention provides a sizing composition and a glass fiber roving formed from strand with the sizing composition thereon which is useful in the production of fiber reinforced molding compounds. Further, this invention provides composites formed from such molding compounds with improved strength and uniformity.

Further, the instant invention provides a sized glass fiber strand which is easily processed both during formation and subsequent to formation, in that the sizing composition is nonmigratory. Still further, the invention provides a strand which is easily formed into roving, is pliable, chops and disperses easily, and imparts adequate wet-out and wet-through characteristics to SMC and BMC formed therefrom.

Further advantages of the instant invention will become apparent with the further description thereof.

BRIEF DESCRIPTION OF THE INVENTION

The sizing composition of the instant invention comprises two polyester resins. The first polyester resin is a water solubilized condensation cross-linkable unsaturated polyester resin salt which is substantially insoluble in aromatic solvents when cross-linked. The second polyester resin is an unsaturated water dispersible polyester resin insoluble in the first polyester resin. Thus, when a solution of the first polyester resin salt is formed and the second polyester is added thereto, a dispersion is formed with the first polyester resin salt and water forming the continuous phase and the second polyester resin forming the dispersed phase. A plasticizer is included in the composition to provide flexibility to the strand and to control the coalescence of the polymers on the strand to form a uniform fiber. The coupling agent which is used to couple the glass to the resin matrix is a dual-coupling agent system, both coupling agents being silanes. The first silane is highly adhesive in nature and promotes adhesion between the glass fibers and the resin matrix. The second silane coupling agent has substantially lesser bonding characteristics than the first silane coupling agent, but controls the wetting of the glass fibers by the first silane coupling agent. Finally, a thermoplastic polymer of sufficiently low molecular weight to impart pressure sensitive adhesive characteristics to the sizing composition is included. Typically the sizing solution is applied to glass fibers during formation at a total solids content of about 2 to 20 percent by weight, preferably 9 to 17 percent by weight.

DETAILED DESCRIPTION OF THE INVENTION

By "water soluble resin" is meant that a mixture of water and resin yields a single phase homogeneous solution. By "water dispersible resin" is meant that a mixture of water and resin yields a two-phase homogeneous mixture. By "substantially insoluble" is meant that a given solvent will form a heterogeneous mixture with a given resin.

Typically a first water soluble polyester resin is incorporated in the sizing composition in an amount from about 1 to 10 percent by weight of the total solids. This polyester resin can be formed from carboxylic acids and polyhydric alcohols by techniques known to those skilled in the art. In all cases, however, an ethylenically unsaturated carboxylic acid or anhydride such as maleic anhydride, maleic acid, fumaric acid or the like must be a major component in the formation of the polyester condensation product in order to impart adhesive characteristics between the dispersed strand and the resin matrix. It is believed that this adhering characteristic is imparted by the interpolymerization of the size on the strand and the resin matrix through the double bonds in the size and the resin. A typical water soluble unsaturated polyester resin has a polycarboxylic acid having more than two carboxyls per molecule as a component in the synthesis thereof. Therefore, because a portion of the carboxylic acids employed in the synthesis of the polyester resin have a functionality of greater than 2, a substantial amount of free carboxyl will be available for subsequent dispersion of the polyester resin in water by salt formation and condensation cross-linking thus producing substantial insolubility of the size in aromatic solvents when the size is cross-linked. The solubilization is accomplished by means of the addition of a volatile amine which is capable of forming a salt with the pendant carboxyl groups on the polyester chain. Typically, triethyl amine, dimethyl ethanol amine, ammonia and the like can be utilized in solubilizing the polyester resin provided the solubilizing agent can be dissociated from the sizing composition and evaporated at acceptable curing temperatures and times, i.e., 120° to 177° C. from 2 to 24 hours.

The curing time and degree of curing of the polyester can be adjusted by the selection of the nitrogenous base used to solubilize the polyester resin. A high boiling amine, i.e., dimethyl ethanolamine, will require substantial time and temperature to fully dissociate from the strand, hence if complete cure of the size is not desired, complete dissociation of the amine will not be conducted. If a low boiling solubilizing base, e.g., ammonia is used, cure times and temperatures can be substantially reduced.

This first water solubilized polyester resin provides a glass fiber strand with good wet out.

The excess carboxyl functionality of the polyester resin necessitates care in its synthesis in order to avoid cross-linking by condensation. The acid functional polyester resin is condensation polymerized to a point near its gel or cross-linking point so that when the glass fiber strand with the size thereon is subjected to heat, the polyester resin will condensation cross-link with itself or other hydroxyl functionality present in the solids of the sizing composition. Typically, trimellitic anhydride or trimellitic acid is used in the synthesis of the polyester resin along with maleic anhydride and a polyhydric alcohol to obtain the solubilization and condensation cross-linkable properties of the polyester.

Further, other saturated dicarboxylic acids may be used in the condensation of this first polyester resin. However, only a minor amount of the difunctional, saturated dicarboxylic acid may be used in order that no substantial detraction of unsaturation or pendant carboxylation in the polyester is obtained which will detract from the water solubility and the condensation cross-linking properties of the final sizing solution.

The second polyester resin which is water dispersible but insoluble in the first polyester resin is incorporated at a level of 2 to 10 percent by weight of the sizing composition. Typically, this polyester is formed from maleic, fumaric or the like previously mentioned unsaturated carboxylic acids or anhydrides and a polyhydric alcohol such as those previously discussed. Further, non-free radically polymerizable dicarboxylic acids may be utilized in the synthesis of the polyester in a mole ratio which does not detract from the capability of the second polyester to bond the glass with the resin matrix to be subsequently applied to the surface of the glass fibers. Further, the second polyester resin imparts nonmigrating characteristics to the size. This second polyester resin is believed to provide good wet through to the glass fiber strand. This good wet through is provided by retarding the wet out with the polyester molding compound of the glass. By having a polyester resin in the sizing composition which has an affinity for the polyester molding compound to be reinforced therewith, extreme intimacy of contact between the resin and the glass will be obtained.

The plasticizer is added to the sizing composition to impart pliability to the glass fiber strand and the roving associated therewith for ease in processing during forming, fabrication of the roving, chopping of the roving prior to incorporation into the resin matrix and to aid in the coalescence of the sizing composition solids into a continuous film on the strand. Generally, the plasticizer is incorporated into the sizing composition at a level of 2 to 10 percent by weight based on the total sizing solution. A particularly advantageous plasticizer is tricresyl phosphate. Other plasticizers known to those skilled in the art may be utilized so long as they impart the necessary properties of flexibility and processability necessary to the strand and roving formed therefrom and to aid in the coolance of the sizing solids. Typical other plasticizers are dioctyl phthalate, dibutyl phthalate, ethyl ortho-benzol benzoate, and the like.

The combined coupling agent system of the invention utilizes two coupling agents both preferably silanes. The first coupling agent is one having amino functionality which can be designated by the general formula $$NH_2R-Si-(OR_2)_3$$

wherein R is an alkylene radical having from two to eight carbon atoms and $R_2$ is a lower alkyl radical or hydrogen; the lower alkyl radical having one to five carbon atoms, preferably one or two carbon atoms.

The second silane coupling agent characteristically has a reactive moiety thereon which is free radically polymerizable such as acrylate, methacrylate, alkyl, vinyl or the like. A particularly advantageous acrylate coupling agent is gamma-methacryloxypropyltriethoxysilane. However, other unsaturated coupling agents such as vinyl triethoxy silane, vinyl trimethoxy silane and the like may be utilized as the second coupling agent.

Typically, each silane coupling agent is incorporated into the sizing composition at a level of 0.1 to 5 percent by weight based on the total weight of the sizing solution.

The thermoplastic polymer is incorporated into the sizing composition to provide a strand which is sufficiently tacky to adhere the strands together to ease in the production of the roving. However, much tack of the strand should be avoided so that the roving can be readily unwound and processed through the chopping device without filament breakage.

Typical thermoplastic pressure sensitive polymers useful for incorporation into the size are low molecular weight acrylic resins synthesized from the homopolymerization, copolymerization or interpolymerization of methyl methacrylate, ethyl acrylate, 2-ethyl-hexyl acrylate, butylacrylate, styrene, vinyl acetate and the like. Other thermoplastic polymers may be used so long as they provide a sufficient tack level to the glass fiber strand. One polymer has been found to be particularly useful in the size of the invention. This polymer is a PAISLEY 76-3663 which is a vinylacrylic copolymer emulsion supplied as a 50 percent ± 2 percent water emulsion having an average particle size of 0.5 micron, a viscosity of 1500 to 2000 centipoises and a pH of 6 to 7.

In preparing the sizing composition of the invention, the water solubilized polyester resin solution is diluted further with water. To this water solution is added the second polyester resin to form a dispersion. The water and the first polyester resin which has been solubilized forms the continuous phase of the dispersion and the second polyester resin forms the dispersed phase of the dispersion. This physical relationship between the first polyester resin and the second polyester resin prevents the migration of the sizing composition during drying. A completely water soluble sizing composition migrates to the surface of the forming package during drying because the water carries the sizing solids with it as it travels to the surface of the package. Typically when a water soluble size is used, a variation in loss on ignition of the strand varies between 0.6 percent on the interior of the forming package to 3.5 percent on the exterior of the package.

By having the one polyester resin in a continuous aqueous phase of a dispersion and a second polyester resin in the dispersed phase of the dispersion, the variation in loss on ignition of the strand is about 2.2 on the interior of the forming package to 2.6 on the exterior of the package.

Further, the pH of the mixture of the first and second polyester resin should be controlled to be between 3 and 7 and more preferably 6 to 7. At pH ranges of 8 and above, it has been found that the second polyester dissolves in the water and solubilized polyester phase of the dispersion thus forming a solution hence distracting from the nonmigratory characteristics of the sizing composition.

Generally there are two types of chemically thickened molding compounds which have found major utility for making articles formed therefrom. These are bulk molding compounds (BMC) and sheet molding compounds (SMC). Both BMC and SMC are formed from a thickened polyester resin having a polymerizable monomer therein. Typically the polyester resin is thickened with magnesium oxide or magnesium hydroxide. A relatively low viscosity is encountered on initial mixing of the magnesium oxide with the unsaturated polyester-monomer solution. After aging this solution, it substantially thickens to form a compound having a viscosity much like a dough (i.e., 10 to 70 million centipoise).

The polyester may also contain fillers such as clay, talc, calcium carbonate, silica, calcium silicate and the like. Additionally, pigments may be added to impart color to the molding compound.

The unsaturated polyester resinous material is based on an unsaturated condensation polyester blended with an alpha, beta ethylenically unsaturated monomer and may further include a thermoplastic polymer. Typically the polyester is used in amounts ranging from 20 to 80 parts by weight of the total resinous system and preferably in amounts ranging from 25 to 65 parts by weight. This class of unsaturated polyesters in itself is not unique and methods of preparing them are well known. These polyesters are synthesized by the condensation of an unsaturated dicarboxylic acid or anhydride or mixtures thereof with a polyhydric alcohol. Further, other carboxylic acids not having free radically polymerizable functionality may be utilized so long as enough unsaturated carboxylic acid is condensed into the polymer chain to provide adequate cross-linking with the ethylenically unsaturated monomer. Preferably, maleic anhydride, maleic acid or fumaric acid are among the preferred unsaturated carboxylic acids or anhydrides. However, other unsaturated acids may be used, for example, chloromaleic acid or anhydride, tetrahydrophthalic acid or anhydride and the like. Typically, the nonfree radically polymerizable carboxylic acids or anhydrides may be used in an amount up to about 25 mole percent based on the total dicarboxylic acid and/or anhydride incorporated into the condensation polymer. Examples of such nonfree radically polymerizable dicarboxylic acids or anhydrides are phthalic, isophthalic, terephthalic, succinic, adipic, sebasic, methyl succinic, hexahydrophthalic and the like.

The polyhydric alcohols useful in preparing the unsaturated polyester resin to be used in the resinous material are the dihydric alcohols such as propylene glycol, dipropylene glycol, diethylene glycol, 1,3-butanediol, 1,5-tetramethylene glycol and the like, the trihydric alcohols such as trimethylol propane, trimethylol ethane, clycerol and the like and the tetrols such as pentaerythritol and the like. Typically the condensation polymers have a molecular weight of about 500 to 5,000 and preferably from about 700 to 2,000 and have an acid number of less than 100 and more preferably less than 70.

The ethylenically unsaturated monomer must be copolymerizable with the unsaturated polyester resin hereinbefore described to provide a cross-linked final product. Typically, styrene and vinyl toluene are the preferred ethylenically unsaturated monomers. Other monomers may be utilized such as the acrylic monomers, preferably the lower alkyl esters (i.e., 1 to 10 carbon atoms) of acrylic acid; aromatic monomers such as chlorostyrene and the like; and in some cases difunctional ethylenically unsaturated monomers may be utilized such as diethyleneglycol diacrylate, 1,3-butane diol dimethacrylate and the like. Typically the monomer is used at a level of 20 to 80 parts by weight of the total system and preferably between 35 to 75 parts by weight.

In order to free radically polymerize and thereby cross-link the polyester resin, free radical initiators such as benzoyl peroxide, tertiary butyl peroctoate, ditertiary butyl peroctoate, cyclohexanone peroxide, ditertiary butyl peroxide, lauryl peroxide and the like, must be utilized. Usually a concentration of 0.1 to 3 percent by weight based on the resinous system is incorporated to provide adequate curing.

Further, to impart minimum shrinkage during the curing cycle, e.g., to minimize the density difference between the cured resinous molding compound and the liquid resinous molding compound, thermoplastic polymers are normally incorporated into the molding compound. These are usually acrylic polymers such as polymethylmethacrylate, polyethylmethacrylate, polybutylacrylate, polymethylacrylate, polystyrene and the like, and copolymers thereof. Further, vinyl halide polymers such as vinylchloride or vinylchloride — vinylacetate copolymers may be utilized and also the cellulosic polymers such as cellulose acetate butyrate, or cellulose acetate propionate. Also, vinyl acetate polymers and ethylene vinyl acetate copolymers may be used to reduce shrinkage.

Bulk moding compound (BMC) is prepared by mixing in a high shear mixer the unaged polyester monomer solution having the thickening agent and the other ingredients therein along with chopped glass fiber strand or roving. This high shear mixer homogeneously disperses the glass fibers throughout the resinous phase of the composition thus forming a bulk molding compound which, after thickening on aging, can be sliced into desired shapes such as cubes and the like and placed in a press to form articles of the desired design.

Sheet molding compound (SMC) is formed by first coating the polyester resin premix, with a thickening agent therein, on a nonadhering surface such as a polyethylene sheet. A uniform film of the desired thickness is applied to the sheet as it travels on a conveyor belt. Chopped glass fiber roving, strand or mat is uniformly disposed onto the polyester resin coating. A second nonadhering substrate is coated with the same polyester resin premix and brought in contact with the first polyester resin with the glass fibers thereon. Subsequent to the joining of the two polyester coatings, the sandwich is kneaded with a plurality of rollers having varying configurations to uniformly distribute the glass fibers throughout the polyester premix. The sandwich is then taken up on a roll and can be used in subsequent molding operations.

The glass fiber chopped strand which is dispersed across the surface of the first polyester resin premix coated substrate is normally formed by taking a plurality of roving packages, threading the ends of each roving package through a plurality of guide eyes into a chopping device which chops the roving to the desired length, and disperses the glass onto the polyester resinous coated substrate in the form of chopped glass strand.

In order to form an acceptable bulk or sheet molding compound, glass fibers must have an acceptable size on their surface. The solubility of the glass fiber sizing composition in ethylenically unsaturated aromatic solvents can affect the final properties of the molded product. In instances where severe shear is necessary to disperse the glass fibers throughout the polyester premix, it is desirable to have a sizing composition which is substantially insoluble or totally insoluble in the polyester resin premix to prevent filamentation of the strand, i.e., to keep the filaments in discrete bundles. When severe shear is not necessary to homogeneously disperse the glass fiber strand throughout the polyester premix during compounding and molding, increased solubility of the size on the strand can be tolerated. Further, and especially in SMC, the individual strands of fibers are to be homogeneously dispersed throughout the premix in order to form a uniform sheet molding compound.

If the sizing composition on the glass fibers is not properly formulated, the fibers will not disperse uniformly through the resin premix. The characteristic of the molding compound formed from the polyester and glass fibers which describes the homogeneity of the premix composite is called "wet through" or "flow through". It is desirable to have a high degree of wet through in a sheet molding compound in order that the final physical properties of the molded articles and the processability thereof be at their maximum level. On the other hand, it is also desirable that the glass fiber strands be wet out during compounding which means that the resin encapsulates the glass fiber strands and no bare glass is visible throughout the formed molded compound. Wet out during compounding is a measure of the apparent intimacy of contact between the resin matrix and the glass fiber strand. If the glass fibers are not immediately wet out following compounding and it is not expected that they will wet out on aging due to the increasing of the viscosity of the compound, there will be adverse effects on the processability, molding characteristics and surface properties of the final molded article.

The following examples will further elucidate the concept of the invention.

EXAMPLE I (Polyester A)

Four moles of propylene glycol, 1 mole of maleic anhydride, and 1 mole of isophthalic acid were charged to a reaction vessel equipped with a stirrer, a heating apparatus, an inert gas inlet, a thermometer to determine the temperature of the reaction and a thermometer placed at the top of a distillation column to determine the temperature of the effluent from the reaction mixture. The above ingredients were esterified to an acid value of 8.2. One mole of trimellitic anhydride was added thereto and reacted with the above formed polyester until a cure time of less than 30 seconds at 220° C. was obtained. The resin was stoichiometrically neutralized with an aqueous triethyl amine solution.

The following table demonstrates the progress of the reaction:

Table I

| Time (hrs.) | Kettle Temp. (° C.) | Effluent Temp. (° C.) | Distillate (mls.) | Inert Gas Sparge Rate (liters/hr.) | Acid No. | Cure Time (sec.) | Remarks |
| --- | --- | --- | --- | --- | --- | --- | --- |
| 0 | RT | RT | 0 | 14.16 | — | — | Materials charged, heat on. |
| 1 | 180 | 98 | 1st drop | 14.16 | — | — | First water off. |
| 3 | 195 | 97 | 52 | 14.16 | — | — | — |
| 4.7 | 210 | 91 | 69 | 28.32 | — | — | Increase sparge. |
| 6.3 | 215 | 74 | 80 | 28.32 | 20.2 | — | — |
| 8.6 | 216 | 39 | 82 | 28.32 | 8.2 | — | — |
| 8.8 | 216 | 35 | 83 | 14.16 | — | — | Cool lower sparge. |
| 9 | 205 | — | — | 14.16 | — | — | Charge TMA, empty distillate. |
| 9.25 | 195 | 97 | 1st drop | 14.16 | — | — | Charge completed. |
| 9.9 | 202 | 90 | 29 | 14.16 | — | — | No vortex - reduce heat. |
| 10.8 | 192 | 60 | 40 | 14.16 | 63.2 | 42 | — |
| 11 | 192 | 55 | 41 | 14.16 | — | 27 | Heat off. Begin to blend resin into distilled water and appropriate amount of triethylamine. |

The final resin had an acid number of 57.2, a cure time of 28 seconds, a nonvolatile content of 30 percent, a Gardner-Holt viscosity of A-1 at 25° C., a Gardner color of 1, and a pH of 7.4. Of particular importance is the cure time of the final resin so that when such a resin is incorporated into the sizing composition and the fibers are sized therefrom, subsequent heating will condense the free carboxylic acid in the polyester resin. The cure time is determined by heating the polyester at 200° C. and measuring the time required for gelation. Generally in the above type of polyester, an acid value from 30 to 90, preferably 40 to 60, is necessary to obtain proper solubilization and cross-linking of the sizing composition.

(Polyester B)

A polyester resin was synthesized in the conventional manner using 6 mols of maleic anhydride, 4 mols phthalic anhydride, 10.5 mols of ethylene glycol, 0.2 mole of CARBOWAX 1540 w, a high molecular weight, polyethylene glycol. The components were condensed to an acid value between 18 and 26 and a Gardner viscosity of 0 to Q at 60 percent resin solids in ethyl CELLUSOLVE.

Seventy-five parts of the above polyester resin are mixed with 25 parts of ethyle CELLUSOLVE, 0.1 part of 2,6-ditertiarybutyl paracresol and 0.002 part of methyl quinone.

Preparation of the Size 75.71 liters of water were charged to a mix tank equipped with an agitator and 2,682 grams of alpha-aminopropyltriethoxy silane were added to the mix tank with agitation. 75.71 liters of water were charged to an emulsification tank equipped with a high shear EPPENBAUCH agitator. 1,722 grams of ABEX 18S, an anionic emulsifier having a solids content of 35 ± 170 and pH of 7.5 to 8.5 at 25° C. sold by Alcolar Chemical Corporation, 1,722 grams of tricresyl phosphate, and 38,499 grams of polyester B were charged sequentially to the emulsification tank with agitation. The agitation was continued until a homogeneous emulsion was obtained. 37.85 liters of water were charged to a premix tank equipped with an agitator, 73,547 grams of polyester A were charged to the premix tank with agitation. To a second premix tank was charged, with agitaion, 2 grams of acetic acid, 56.78 liters of water and 2,682 grams of alpha-methacryloxypropyltriethoxy silane. The contents of the emulsification tank, the first premix tank and the second premix tank were charged sequentially to the mix tank and agitated until homogeneous at which time 1,344 grams of vinyl acrylic thermoplastic polymer, 50 percent solids in water was added to the mix tank after being diluted with 7.5 liters of water. The total volume of the size was brought to 378.5 liters. The size had a pH of 6.7 ± 2, a solids content of 17 ± 2 percent.

The following table shows the composition of the sizing solution:

Table II

| Ingredient | Amount (%) |
| --- | --- |
| Polyester resin A | 5.84 |
| Polyester resin B | 7.66 |
| Anionic surfactant | 0.45 |
| Tricresyl phosphate | 0.45 |
| Gamma-aminopropyltriethoxysilane | 0.58 |
| Gamma-methacryloxypropyltrimethoxysilane | 0.58 |
| Methyl methacrylate copolymer | 1.78 |
| Deionized water | 82.66 |

The above sizing solution provides a glass strand with about 2.2 to 2.6 percent by weight of the dried size composition on the strand based on the total weight of the glass and with the dried residue of the sizing solution thereon.

Glass fibers drawn from a bushing were sized with the above sizing composition during formation. The individual sized filaments were gathered into strands and collected on a forming tube mounted on an 20.32 cm collet which was rotating at 4100 revolutions per minute. A plurality of forming packages as above formed were dried in an oven at 133° C. for 11 hours. Fifteen of these forming packages were mounted on a creel, braided into roving, and collected on a rotating spindle to form a roving ball. The ends of 22 of such roving balls were threaded into the chopper of a SMC machine.

A sheet molding compounding resin having the following composition was used to form the sheet molding compound:

Table III

| Ingredient | Amount |
| --- | --- |
| Resin - 1:1 propylene maleate polyester | 65% |
| Styrene | 35% (60 parts) |
| Thermoplastic acrylic polymer (polyvinylacetate) | 30 parts |
| Calcium oxide filler | 150 parts |

Table III-continued

| Ingredient | Amount |
|---|---|
| Peroxide catalyst benzoyl peroxide | .5 part |
| Thickening agent - Magnesium oxide | .65 part |
| Release agent | 5 parts |
| Pigment (black) | .26 part |

The above SMC formulation was applied to the surface of a polyethylene sheet at a uniform coating thickness. The glass fiber roving was chopped and the strand inherently separated from the roving and uniformly dispersed upon the coated polyester. The same polyester was coated on a second polyethylene sheet and the two resin surfaces were joined together to form a sandwich. The sandwich was kneaded with a plurality of rolls to uniformly mix the glass fiber chopped strand and the polyester molding compound. The sandwich was then wound on a roll.

Several sheet molding composites were made in accordance with the above method using different thicknesses of polyester coating on the polyethylene sheet and adjusting the linear speed of travel of the polyester fiber glass sandwich. A linear speed of 152 centimeters per minute with a density of 3417 grams per square meter produced a sheet molding compound with a 100 percent wet through which means that the glass fiber strand was homogeneously mixed throughout the polyester molding compound. Also the strands had complete encapsulation by the polyester molding compound and no bare glass was observed. At a linear speed of 670 centimeters per minute at a density of 5858 grams per square meter, the wet through and wet out were still maintained at 100 percent. At a linear speed of 609 centimeters per minute at a density of 8298 grams per square meter, observation showed that the wet through was 90 percent and the wet out was 60 percent on a relative basis.

EXAMPLE II

A commercial glass fiber roving was used in sheet molding compound utilizing the same polyester for the molding compound in the same method as above described. Sheet molding compound made from the roving of Example I and the commercial roving were molded and tested for flexural strength, flexural modulus, tensile strength and Izoid notched impact.

The following table illustrates the superiority of the instant glass fiber sized roving in comparison with the commercially used sheet molding compound using glass fiber roving. The molded articles produced with the roving of the instant invention are designated as roving A and those produced by the commercial roving as roving B.

TABLE III

| Roving | Charge Shape CM × CM | Glass Content % | Flex Str. Newtons/Meter$^2$ | Flex Modules Newtons/M$^2$ × 10$^6$ | Tensile Strength Newtons/M$^2$ × 10$^6$ | Izod Impact (Notched) Newtons |
|---|---|---|---|---|---|---|
| A | 11.43 × 26.61 | 17.3 | 580,527 | 50.18 | 158,644 | 488.9 |
| B | | 19.9 | 476,670 | 50.55 | 168,974 | 415.3 |
| A | | 29.7 | 1,147,403 | 63.09 | 450,475 | 934.1 |
| B | | 32.0 | 977,691 | 58.6 | 398,455 | 800.6 |
| A | | 34.7 | 1,313,426 | 68.99 | 520,205 | 448.7 |
| B | | 35.3 | 132,818 | 70.10 | 441,252 | 944.8 |
| | SMC at 3661 g/m$^2$ | | | | | |
| | 2.54 cm × 46.64 cm moulded panel dimension | | | | | |
| A | 17.78 × 17.78 | 25.0 | 1,125,267 | 62.72 | 453,796 | 822.0 |
| B | | | 1,110,509 | 59.03 | 361,561 | 800.6 |
| A | 11.42 × 26.67 | | 1,005,361 | 55.34 | 383,697 | 741.9 |
| B | | | 878,077 | 59.03 | 339,424 | 709.9 |
| A | 17.78 × 33.02 | | 966,622 | 55.34 | 411,368 | 1056.8 |
| B | | | 881,766 | 59.03 | 332,046 | 816.7 |
| A | 21.59 × 39.37 | | 962.933 | 59.03 | 354,182 | 1121.0 |
| B | | | 914,971 | 62.72 | 324,667 | 827.3 |
| | SMC at 3417 g/m$^2$ | | | | | |
| | 22.86 cm × 40.64 cm moulded panel dimensions | | | | | |
| A | 17.78 × 17.78 | | 1,036,721 | 59.03 | 391,076 | |
| B | | | 885,456 | 51.65 | 287,773 | |
| A | 12.7 × 25.4 | | 1,365,078 | 70.10 | 586,614 | |
| B | | | 1,103,130 | 66.41 | 461,175 | |
| A | 29.21 × 29.21 | | 922,350 | 55.34 | 317,288 | |
| B | | | 771,084 | 55.34 | 265,636 | |
| SMC | SMC at 3417 g/m$^2$ | | | | | |
| | 30.48 cm × 30.48 cm moulded panel dimensions | | | | | |
| A | 17.78 × 7.78 | | 1,180,608 | 62.72 | 376,329 | 864.7 |
| B | | | 1,106,820 | 62.72 | 332,055 | 822.0 |
| A | 10.54 × 26.67 | | 894,679 | 55.34 | 354,192 | 779.3 |
| B | | | 774,774 | 55.34 | 280,402 | 731.3 |
| A | 17.78 × 30.48 | | 889,145 | 55.34 | 335,744 | 774.0 |
| B | | | 872,543 | 59.03 | 298,849 | 763.3 |
| A | 21.59 × 39.37 | | 787,686 | 59.03 | 306,228 | 790.0 |
| B | | | 760,016 | 59.03 | 273,023 | 816.7 |
| | SMC at 8299 g/m$^2$ | | | | | |

As is shown in Table III glass fibers formed by the practice of the invention impart superior physical properties to molded sheet molding compounds with such fibers incorporated therein.

Glass fibers formed with the sizing composition of the invention have further utility in reinforcing thermoplastic resins.

Further, glass fibers formed with the sizing composition of the instant invention have found use in the areas of preform roving, filament winding continuous glass fiber mat, chopped strand mat and pultrusion, showing superior reinforcing characteristics.

As can be recognized by those skilled in the art, variations in components specified in the example and ranges thereof may be made without departing from the scope of the invention. Therefore, the invention is limited only as is set forth in the accompanying claims.

I claim:

1. In the method of forming a molding compound comprising:

coating a nonadhering substrate with thickened polyester resin;
applying chopped glass fiber roving to said coated substrate;
coating a second nonadhering substrate with said polyester resin;
contacting the coatings on said substrates;
mixing the chopped glass fiber roving throughout the resin composition; and
collecting the composite so formed, the improvement comprising:
sizing on said glass fiber roving a composition comprising the dried residue of a sizing composition comprised of a water solubilized first unsaturated polyester resin, said polyester resin being substantially insoluble in aromatic solvents;
a second unsaturated polyester water insoluble resin, said second polyester resin being soluble in said first polyester resin and said second polyester resin preventing the migration of said sizing composition;
a plasticizer;
a first silane coupling agent having amino functionality to promote adhesion between said glass fibers and said resin composite;
a second silane coupling agent which is free radically polymerizable to control the wetting of said glass fibers by said first silane coupling agent;
and a thermoplastic polymer being of sufficiently low molecular weight to impart pressure sensitive adhesive characteristics to said sizing composition.

2. The method of claim 1 wherein said sizing composition is comprised of 1 to 10 percent by weight of said first polyester; 2 to 10 percent by weight of said second polyester; 2 to 10 percent by weight of said plasticizer; 0.1 to 1.5 percent by weight of said first silane coupling agent; 0.1 to 1.5 percent by weight of said second silane coupling agent and 1 to 6 percent by weight of said thermoplastic polymer.

* * * * *